US008000502B2

(12) United States Patent
Dave et al.

(10) Patent No.: US 8,000,502 B2
(45) Date of Patent: Aug. 16, 2011

(54) PORTABLE MEMORY STORAGE DEVICE WITH BIOMETRIC IDENTIFICATION SECURITY

(75) Inventors: Sanjay Dave, Mountain View, CA (US); Kevin M. Conley, San Jose, CA (US); Michael Morganstern, Saratoga, CA (US); Wesley G. Brewer, Menlo Park, CA (US); Robert C. Miller, San Jose, CA (US); Yishai Kagan, Sunnyvale, CA (US); Jean-Christophe Klein, Saratoga, CA (US); Jeff Salazar, Palo Alto, CA (US); Daniel Kennedy, San Francisco, CA (US); Robert Howard, Palo Alto, CA (US); Matt Peterson, San Francisco, CA (US); Joel Jacobs, San Francisco, CA (US)

(73) Assignee: SanDisk Technologies Inc., Plano, TX (US)

( * ) Notice: Subject to any disclaimer, the term of this patent is extended or adjusted under 35 U.S.C. 154(b) by 1369 days.

(21) Appl. No.: 11/076,221

(22) Filed: Mar. 9, 2005

(65) Prior Publication Data

US 2006/0204047 A1   Sep. 14, 2006

(51) Int. Cl.
   *G06K 9/00* (2006.01)
(52) U.S. Cl. .......................... 382/115; 382/118; 340/521
(58) Field of Classification Search .................. 382/115, 382/117, 118, 124; 340/521
   See application file for complete search history.

(56) References Cited

U.S. PATENT DOCUMENTS

| | | | |
|---|---|---|---|
| 6,003,135 A | | 12/1999 | Bialick et al. |
| 6,028,950 A | * | 2/2000 | Merjanian ................ 382/126 |
| 6,045,039 A | * | 4/2000 | Stinson et al. ................ 235/379 |
| 6,628,812 B1 | | 9/2003 | Setlak et al. |
| 6,671,808 B1 | * | 12/2003 | Abbott et al. .................... 726/4 |
| 6,853,739 B2 | * | 2/2005 | Kyle .............................. 382/115 |
| 6,898,299 B1 | * | 5/2005 | Brooks .......................... 382/115 |

(Continued)

FOREIGN PATENT DOCUMENTS

DE   20316819 U1   2/2004

(Continued)

OTHER PUBLICATIONS

Storage Media—Bluetooth cf gps wifi sido—Product Detail, http://www.storagemedia.com, printed Mar. 1, 2005, 2 pages.

(Continued)

*Primary Examiner* — Wesley Tucker
*Assistant Examiner* — Aklilu K Woldemariam
(74) *Attorney, Agent, or Firm* — Vierra Magen Marcus & DeNiro LLP

(57) ABSTRACT

A portable memory storage device is disclosed where access to information on the device is granted only upon proper biometric authentication of a user. The device includes a controller, a non-volatile memory which may be a flash memory, and a biometric scanner system for controlling access to the information within the non-volatile memory. Each of the controller, non-volatile memory and biometric scanner system may be mounted in a base of the portable device, with the biometric system having an exposed surface on a top portion of the base for accepting biometric data such as a fingerprint. A cover is provided which includes a USB connector capable of mating within a USB port of the host device to establish communications between the portable and host devices. The cover also covers the exposed portion of the biometric scanner to protect the sensor when the portable memory storage device is not in use.

16 Claims, 9 Drawing Sheets

U.S. PATENT DOCUMENTS

| | | | |
|---|---|---|---|
| 6,980,672 B2 * | 12/2005 | Saito et al. | 382/124 |
| 7,010,145 B1 | 3/2006 | Haruki et al. | |
| 7,512,807 B2 * | 3/2009 | Hillhouse | 713/186 |
| 2002/0146154 A1 * | 10/2002 | Davis et al. | 382/115 |
| 2005/0036666 A1 | 2/2005 | Wang et al. | |
| 2005/0257071 A1 | 11/2005 | Sugawara | |
| 2006/0006995 A1 * | 1/2006 | Tabankin et al. | 340/521 |

FOREIGN PATENT DOCUMENTS

| | | |
|---|---|---|
| EP | 0 924 656 | 6/1999 |
| EP | 1 083 518 | 3/2001 |
| EP | 1 538 553 | 6/2005 |
| GB | 2 377 526 | 1/2003 |
| JP | 2004110382 A | 4/2004 |
| KR | 20040014900 A | 2/2004 |
| WO | 2005/001755 A | 1/2005 |

OTHER PUBLICATIONS

Biodisk USB 2.0 Flash Drive (128MB)—eXpanysys USA, http://www.expanys-usa.com, printed Mar. 1, 2005, 4 pages.

Lexar—USB Flash Drives—Jumpdrive TouchGuard, http://www.lexar.com, printed Mar. 8, 2005, 2 pages.

ACP 512MB Fingerprint Authent USB Micro Flash Drive—Retail (EPUSBFP/512), http://www.computerhq.com, printed Mar. 1, 2005, 3 pages.

Zones IT Product, http://www.zones.com, printed Mar. 1, 2005, 1 page.

Promotional USB Flash Drive—Fingerprint Flash Disk, http://www.branders.com, printed Mar. 1, 2005, 2 pages.

Product Detail, http://www.pcuniverse.com, printed Mar. 1, 2005, 2 pages.

Sony AIT Tapes, Sony LTO Tapes, Super DLT Tapes & Portable Harddisk Media from ISSIdata.com, http://www.issidata.com, printed Mar. 1, 2005, 2 pages.

UPEK, Inc./Products/USB Readers, http://www.upek.com, printed Mar. 8, 2005, 2 pages.

BioDisk Biometric USB Flash Drive USB 2.0, http://www.card-media.co.uk.com, printed Feb. 28, 2005, 3 pages.

APC Biometric Password Manager Review—Summary—Computer Hardware & Peripherals—Computer . . . , http://www.reviews.designtehnica.com, printed Feb. 28, 2005, 3 pages.

Chinese Office Action dated Mar. 11, 2009 in Chinese Patent Application No. 200680007601.9.

English Translation of Abstract of DE20316819 published Feb. 12, 2004.

European Search Report dated Aug. 16, 2010 in European Application No. 10006614.1.

Office Action dated Jul. 13, 2010 in Japanese Application No. 2008-500778.

English Translation of Abstract of JP2004110382 published Apr. 8, 2004.

Office Action dated May 7, 2010 in Taiwanese Application No. 095108029.

Response to Office Action filed Nov. 8, 2010, Taiwanese Application No. 095108029.

Response to European Office Action dated Dec. 7, 2009 in European Application No. 06736919.9.

European Office Action dated Apr. 15, 2009 in European Application No. 06736919.9.

Korean Office Action dated Jan. 23, 2009 in Korean Patent Application No. 7020619/2007.

European Office Action dated Feb. 28, 2008, European Application No. 06736919.9.

Response to Office Action filed Jan. 11, 2011, Japanese Application No. 2008-500778.

Communication regarding oral proceedings dated Jan. 3, 2011, European Application No. 06736919.9.

\* cited by examiner

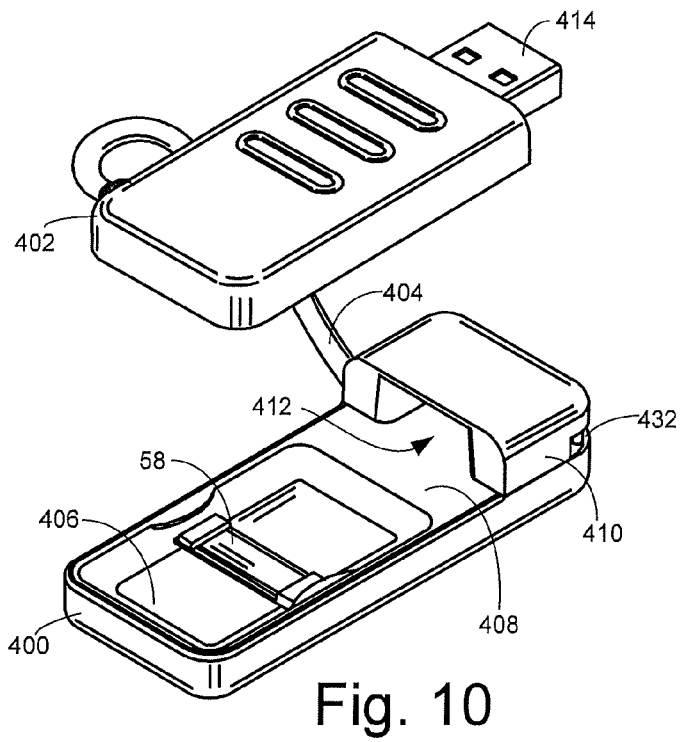
Fig. 10
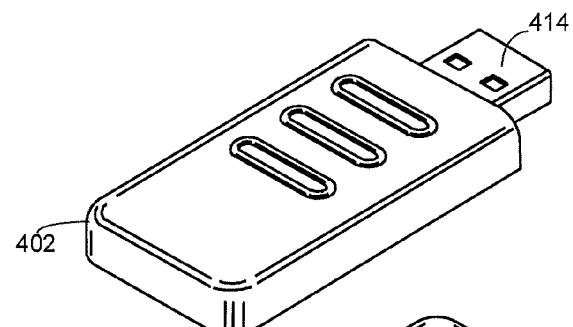
Fig. 11
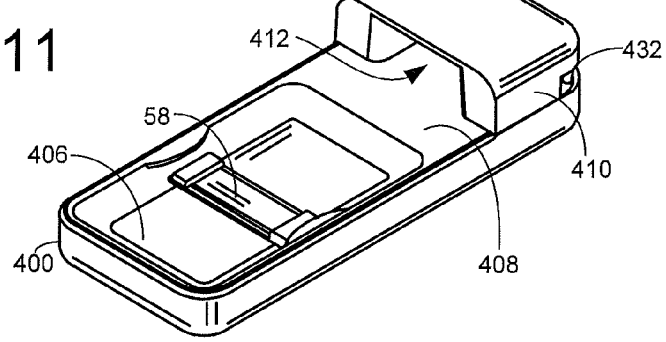

PORTABLE MEMORY STORAGE DEVICE WITH BIOMETRIC IDENTIFICATION SECURITY

CROSS REFERENCE TO RELATED APPLICATION

The present application is related to Design patent application Ser. No. 29/230,382, entitled, "Portable Memory Storage Device" filed currently with the present application. A copy of this Design Patent Application is incorporated by reference herein in its entirety.

BACKGROUND OF THE INVENTION

1. Field of the Invention

Embodiments of the present invention relate to a portable memory storage device with biometric identification security.

2. Description of the Related Art

Non-volatile semiconductor memory devices, such as flash memory storage drives, are becoming widely used to meet the ever-growing demands on digital information storage and exchange. In addition to their small size, portability, high reliability and large capacity, flash memory drives can be conveniently removed from and attached to a wide variety of electronic devices having the appropriate connection port (e.g., a serial bus port such as a USB port or an IEEE 1394 ("Firewire") port).

Concurrent with the rising demand to store and exchange data is the need to keep data secure against unauthorized access. In an effort to make flash memory drives more secure, it is known to provide PIN and password authentication routines before drive access is granted. Additionally or alternatively, it is also known to provide physical key and smartcard systems which allow access to the flash memory drive only upon acceptance of the proper key or smartcard. However, a problem with these security systems is that the access medium may be lost, stolen, forgotten and/or hacked. Biometric security systems, such as fingerprint scanners, have therefore been incorporated into data storage devices such as flash drives. Unlike passwords, smartcards and the like, biometric data is unique and cannot be stolen or reproduced, hence only authorized users are able to access the information on the drive.

An example of a biometric flash memory is disclosed in U.S. Pat. No. 6,707,935, entitled "High Security Flash Memory and Method." As disclosed therein, a fingerprint scanner is embedded in the flash memory device. Before the information stored on the flash memory is accessible, the user. places his or her finger on the scanner, whereupon the user's fingerprint is scanned, digitized and compared against a stored version of the print. Access to the flash memory is granted only upon a match of the scanned and stored prints.

While providing effective security, conventional biometric flash memory devices have drawbacks. First, the port in the host device to which the flash memory is inserted for use is often difficult to access. For example, when used with a desktop or laptop computer, the port is often on the side or back of the computer, which makes it difficult to provide the fingerprint for authentication when the drive is plugged into the port. Moreover, typical biometric scanners are formed of fragile materials. Unlike typical electronics that are encased in a protective housing, biometric scanners must be relatively exposed so as to be able to obtain a clear image of the fingerprint, thumbprint or other biometric data. Thus, it is easy for the scanner to become scratched, damaged or ruined, thus rendering the security features and/or the flash memory device itself useless.

SUMMARY OF THE INVENTION

One embodiment of the invention relates to a portable memory storage device where access to the information on the device is granted only upon proper biometric authentication of a user. The device has a multi-piece construction so that the biometric scanner may remain in a convenient position while the portable memory device is connected to and communicating with a host device. The multiple pieces of the portable memory device also combine with each other when not in use to provide a compact size and convenient shape, and one where the biometric scanner is covered for protection.

Embodiments of the portable memory storage device include a controller, a non-volatile memory which may be a flash memory, and a biometric scanner system for controlling access to the information with the non-volatile memory. Each of the controller, non-volatile memory and biometric scanner system may be mounted in a base of the portable device, with the biometric system having an exposed surface on a top portion of the base for accepting biometric data such as a fingerprint. A cover is provided which, in embodiments, includes a USB connector capable of mating within a USB port of the host device to establish communications between the portable and host devices.

When not in use, the cover affixes to the base to cover and protect the biometric scanner. The base further includes a docking enclosure having a similar configuration as the USB port. The connector on the cover is received within the docking enclosure when not in use, to protect the connector and to provide a compact and convenient form factor to the portable device. The cover may be affixed to the base by a flexible communications cable, which serves to tether the base and cover together, and also to transmit information between the portable and host devices. The cable may be omitted in embodiments in favor of wireless communication between the base and cover.

While the cover is engaged with the serial port of the host device, the cable allows the base and biometric scanner to be positioned in a location that is selectable and convenient to the user. Thus, the biometric data such as a fingerprint may be easily entered while the cover is affixed to and allowing communication with the host USB port.

BRIEF DESCRIPTION OF THE DRAWINGS

FIG. 10 is a perspective view of the portable memory storage device in an open position according to an embodiment of the present invention.

FIG. 11 is a perspective view of the portable memory storage device in an open position according to an alternative embodiment of the present invention.

DETAILED DESCRIPTION

Embodiments of the invention will now be described with reference to FIGS. 1 through 14, which to relate to a portable memory storage device with biometric identification security. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
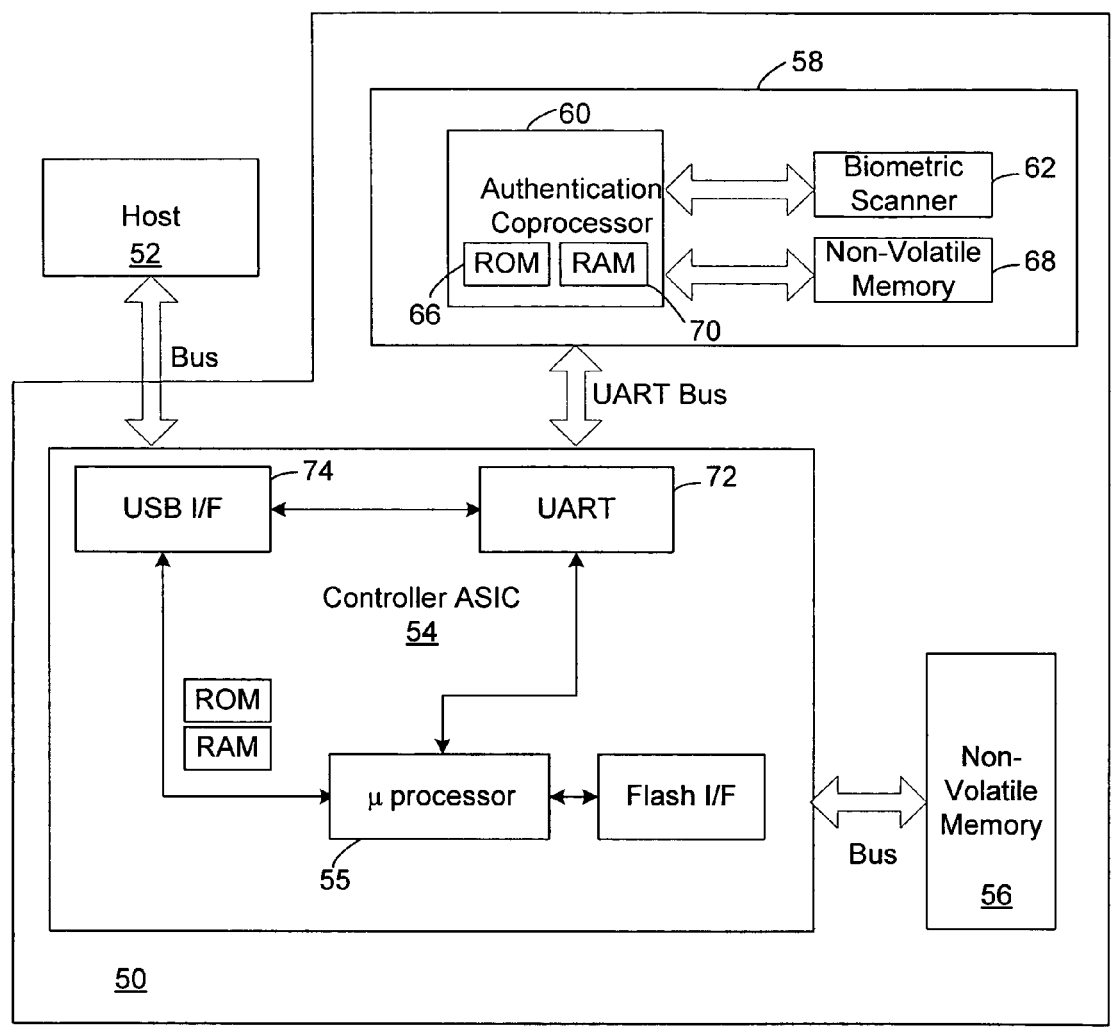
FIG. 1 is a block diagram of functional components of the portable memory storage device in accordance with an embodiment of the invention.

Referring now to FIG. 1, there is shown a block diagram of functional components of a portable memory storage device 50 coupled to a host device 52. The portable memory storage device 50 in general includes an integrated circuit 54, memory 56 and a biometric scanner system 58. The integrated circuit 54 may be implemented as an application-specific integrated circuit (ASIC), but may be implemented as other types of integrated circuits. Some portion of the functions performed by ASIC 54 may also be implemented in software.

Figure 2:
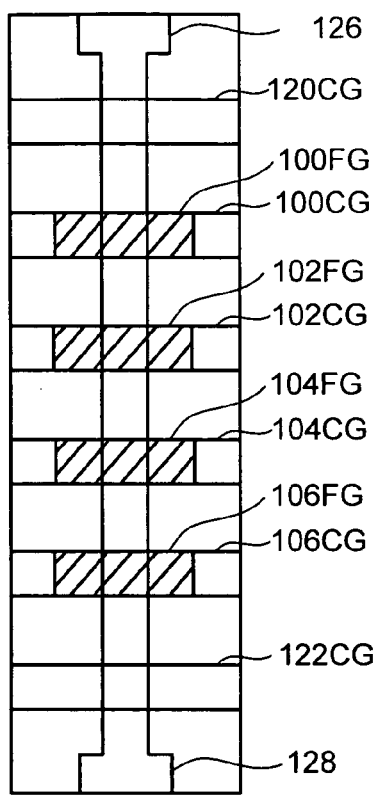
FIG. 2 is a top view of a NAND string.
Figure 3:
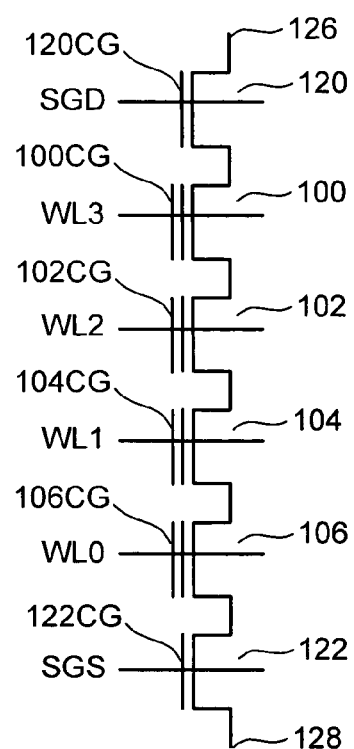
FIG. 3 is an equivalent circuit diagram of the NAND string.

Memory 56 may be any of a variety of semiconductor, non-volatile memories, such as for example a flash memory system. One example of a flash memory system suitable for implementing the present invention uses the NAND structure, which includes arranging multiple transistors in series between two select gates. The transistors in series and the select gates are referred to as a NAND string. FIG. 2 is a top view showing one NAND string. FIG. 3 is an equivalent circuit thereof. The NAND string depicted in FIGS. 2 and 3 includes four transistors 100, 102, 104 and 106 in series and sandwiched between a first select gate 120 and a second select gate 122. Select gate 120 connects the NAND string to bit line 126. Select gate 122 connects the NAND string to source line 128. Select gate 120 is controlled by applying the appropriate voltages to control gate 120CG. Select gate 122 is controlled by applying the appropriate voltages to control gate 122CG. Each of the transistors 100, 102, 104 and 106 has a control gate and a floating gate. Transistor 100 has control gate 100CG and floating gate 100FG. Transistor 102 includes control gate 102CG and floating gate 102FG. Transistor 104 includes control gate 104CG and floating gate 104FG. Transistor 106 includes control gate 106CG and floating gate 106FG. Control gate 100CG is connected to word line WL3, control gate 102CG is connected to word line WL2, control gate 104CG is connected to word line WL1, and control gate 106CG is connected to word line WL0. In one embodiment, transistors 100, 102, 104 and 106 are each memory cells. In other embodiments, the memory cells may include multiple transistors or may be different than that depicted in FIGS. 2 and 3.

Figure 4:
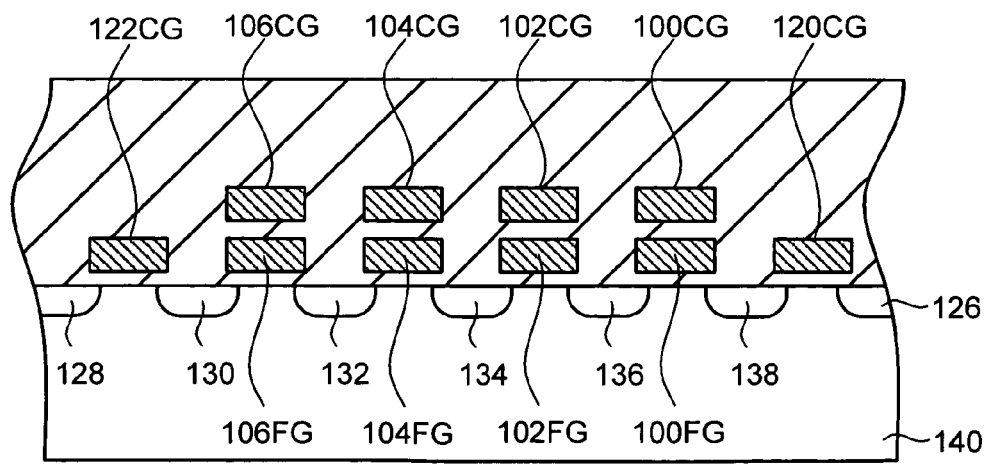
FIG. 4 is a cross sectional view of the NAND string.

FIG. 4 provides a cross-sectional view of the NAND string described above. As depicted in FIG. 4, the transistors of the NAND string are formed in p-well region 140. Each transistor includes a stacked gate structure that consists of the control gate (100CG, 102CG, 104CG and 106CG) and a floating gate (100FG, 102FG, 104FG and 106FG). The floating gates are formed on the surface of the p-well on top of an oxide film. The control gate is above the floating gate, with an inter-polysilicon dielectric layer separating the control gate and floating gate. Note that FIG. 4 appears to depict a control gate and floating gate for transistors 120 and 122. However, for transistors 120 and 122, the control gate and the floating gate are connected together. In other embodiments, the gate traditionally thought of as the floating gate is connected, while the gate on top of that is not connected. The control gates of the memory cells (100, 102, 104, 106) form the word lines. N+ diffused layers 130, 132, 134, 136 and 138 are shared between neighboring cells, whereby the cells are connected to one another in series to form a NAND string. These N+ diffused layers form the source and drain of each of the cells. For example, N+ diffused layer 130 serves as the drain of transistor 122 and the source for transistor 106, N+ diffused layer 132 serves as the drain for transistor 106 and the source for transistor 104, N+ diffused region 134 serves as the drain for transistor 104 and the source for transistor 102, N+ diffused region 136 serves as the drain for transistor 102 and the source for transistor 100, and N+ diffused layer 138 serves as the drain for transistor 100 and the source for transistor 120. N+ diffused layer 136 connects to the bit line for the NAND string, while N+ diffused layer 138 connects to a common source line for multiple NAND strings.

Note that although FIGS. 2-4 show four memory cells in the NAND string, the use of four transistors is only provided as an example. A NAND string can have less than four memory cells or more than four memory cells. For example, some NAND strings will include eight memory cells, 16 memory cells, 32 memory cells, etc. The discussion herein is not limited to any particular number of memory cells in a NAND string.

Each memory cell can store data represented in analog or digital form. When storing one bit of digital data, the range of possible threshold voltages of the memory cell is divided into two ranges which are assigned logical data "1" and "0." In one example of a NAND type flash memory, the threshold voltage is negative after the memory cell is erased, and defined as logic "1." The threshold voltage after a program operation is positive and defined as logic "0." When the threshold voltage is negative and a read is attempted by applying 0V on the word line, the memory cell will turn on to indicate logic one is being stored. When the threshold voltage is positive and a read operation is attempted by applying 0V on the word line, the memory cell will not turn on, which indicates that logic zero is stored. A memory cell can also store multiple levels of information, thereby, storing multiple bits of digital data. In the case of storing multiple levels of data, the range of possible threshold voltages is divided into the number of storage levels. For example, if four levels of information are stored, there will be four threshold voltage ranges assigned to the data values "11", "10", "01", and "00." In one example of a NAND type memory, the threshold voltage after an erase operation is negative and defined as "11". Positive threshold voltages are used for the states of "10", "01", and "00."

Relevant examples of NAND type flash memories and their operation are provided in the following U.S. Patents, all of which are incorporated herein by reference in their entirety: U.S. Pat. Nos. 5,570,315; 5,774,397; 6,046,935; 5,386,422; 6,456,528 and 6,522,580. Information about programming NAND flash memory, including self boosting techniques, can be found in U.S. Pat. No. 6,859,397, entitled "Source Side Self Boosting Technique For Non-Volatile Memory," issued on Feb. 22, 2005; and in U.S. patent application Ser. No. 10/629,068, titled "Detecting Over Programmed Memory," filed on Jul. 29, 2003, which patent and application are incorporated herein by reference in their entirety. Other types of flash memory devices can also be used with the present invention. For example, the following patents describe NOR type flash memories and are incorporated herein by reference in their entirety: U.S. Pat. Nos. 5,095,344; 5,172,338; 5,890,192 and 6,151,248. Another example of a flash memory type is found in U.S. Pat. No. 6,151,248, incorporated herein by reference in its entirety.

The technology described herein is not limited to floating gate types of memory, but may also be applicable to memory cells that use other types of material for the charge storage. For example, the technology described herein can be used with memory devices that use various types of charge storage regions/layer(s) between the control gate (or word line) and the substrate, such as a nitride layer or small silicon islands, better known as nano-crystals. In embodiments, memory 56 may have a storage capacity of 512 megabytes (MB) or 1 gigabyte (GB). However, these storage capacities are merely exemplary, and the storage capacity may vary in alternative embodiments.

Figure 5:
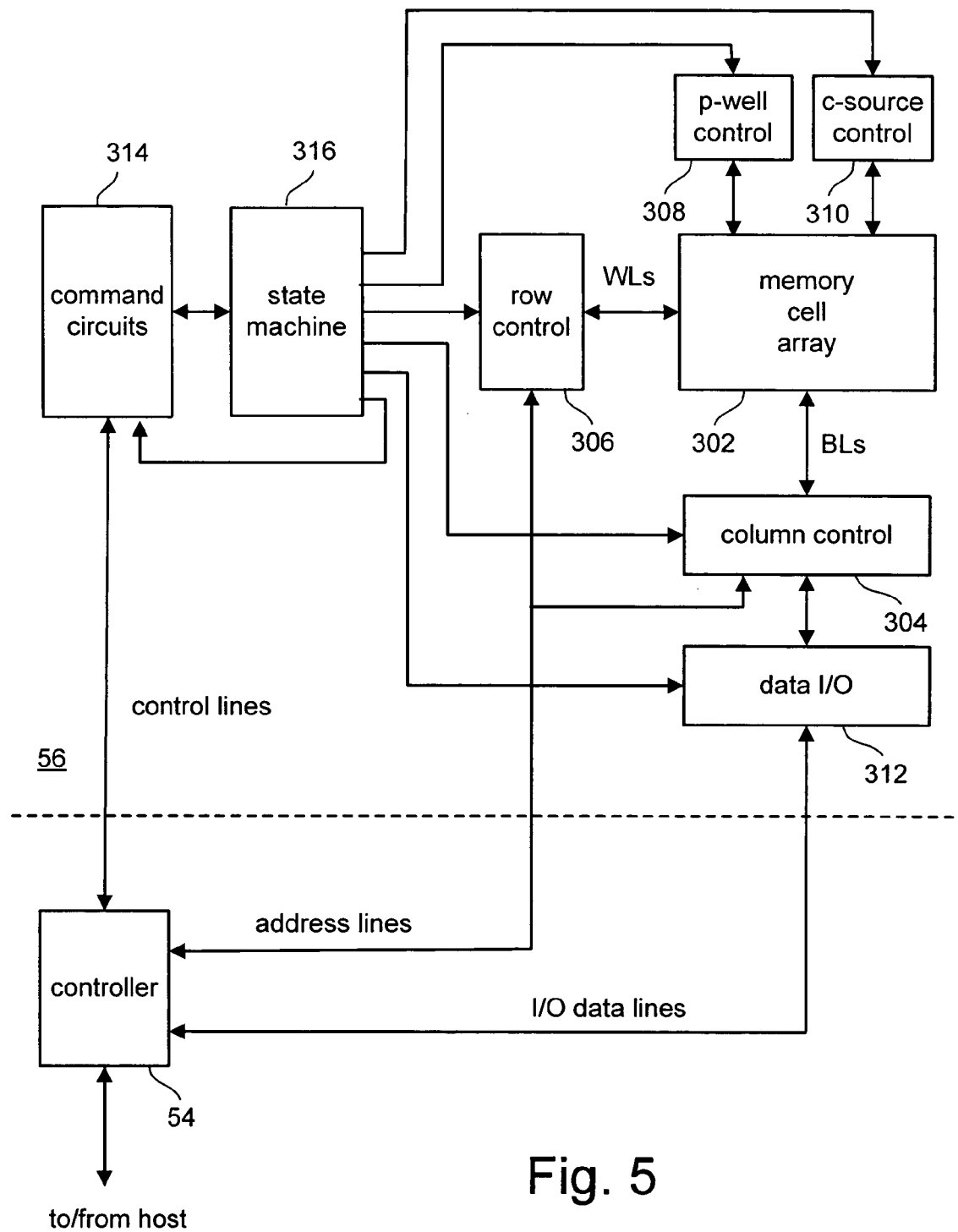
FIG. 5 is a block diagram of one embodiment of a non-volatile memory system according to the present invention.

FIG. 5 is a block diagram of the ASIC 54 and memory 56 of FIG. 1 according to one embodiment of the present invention. Memory cell array 302 is controlled by column control circuit 304, row control circuit 306, c-source control circuit 310 and p-well control circuit 308. Column control circuit 304 is connected to the bit lines of memory cell array 302 for reading data stored in the memory cells, for determining a state of the memory cells during a program operation, and for controlling potential levels of the bit lines to promote the programming or to inhibit the programming. Row control circuit 306 is connected to the word lines to select one of the word lines, to apply read voltages, to apply program voltages and to apply an erase voltage. C-source control circuit 310 controls a common source line connected to the memory cells. P-well control circuit 308 controls the p-well voltage.

The data stored in the memory cells are read out by the column control circuit 304 and are output to external I/O lines via data input/output buffer 312. Program data to be stored in the memory cells are input to the data input/output buffer 312 via the external I/O lines, and transferred to the column control circuit 304. The external I/O lines are connected to controller 54.

Command data for controlling the flash memory device is input to controller 54. The command data informs the flash memory of what operation is requested. The input command is transferred to state machine 316, which controls column control circuit 304, row control circuit 306, c-source control circuit 310, p-well control circuit 308 and data input/output buffer 312. State machine 316 can also output status data of the flash memory such as READY/BUSY or PASS/FAIL.

Controller 54 is connected or connectable with a host device 52, which may be a personal computer, a digital camera, personal digital assistant, cellular telephone, etc. Controller 54 communicates with the host in order to receive commands from the host, receive data from the host, provide data to the host and provide status information to the host. Controller 54 converts commands from the host into command signals that can be interpreted and executed by command circuits 314, which are in communication with state machine 316. Controller 54 typically contains buffer memory for the user data being written to or read from the memory array. Additional details relating to the memory system used in embodiments of the invention may be found in U.S. Patent Application No. 10/761,620, entitled, "Programming Non-Volatile Memory" (attorney docket No. SAND-01017US0), which application is incorporated by reference herein in its entirety.

Biometric scanner system 58 includes an authentication coprocessor 60 and a biometric scanner 62. The coprocessor and scanner cooperate to accept and authenticate biometric data as explained in greater detail hereinafter. In embodiments of the invention, the biometric scanner system is of the type to accept fingerprints and/or thumbprints. However, it is understood that biometric scanner system 58 may be of the type to accept other unique personal identifier data, including but not limited to a retina scanner and a voice print identification device.

In embodiments of the invention, scanner 62 may be a silicon-based capacitive fingerprint/thumbprint sensor of the type marketed by UPEK, Inc. of Emeryville, Calif. 94608. In general, scanner 62 is comprised of a two-dimensional array of capacitive sensing cells, each containing an active capacitive feedback circuit whose effective feedback capacitance is modulated by the presence of live skin close to the surface of the sensor. When live skin is brought in close proximity to a sensor cell, the skin interferes with electric field lines within the cell and reduces the effective capacitance. When the skin is on the sensor surface (fingerprint ridge) the feedback capacitance is minimized, while when the skin is far from the sensor surface (fingerprint valley) the feedback capacitance is maximized.

This difference in capacitance (presence or absence of skin) can be measured for each cell in the two-dimensional array to capture the entire print image. The output of the sensor array may be passed through an analog signal-conditioning block providing the capability to adjust sensor gain and offset before the signal is converted through an on-chip A/D converter into an 8-bit digital signal for encryption and storage as explained hereinafter. It is understood that the above method of obtaining biometric data is by way of example only, and those of skill in the art would appreciate other devices and methods may be used for obtaining a digital signal of biometric data.

In embodiments of the invention, all storage of scanned biometric data and comparison against input biometric data are performed within the biometric scanner system 58. In particular, authentication coprocessor 60 may have associated ROM 66 having software for executing initialization of biometric scanner system, and comparison of biometric data within the biometric scanner. The authentication coprocessor 60 may also have non-volatile memory 68 for storing encrypted reference pattern(s) of biometric data as explained hereinafter. Non-volatile memory 68 may be a flash memory similar to flash memory 56 described above. In alternative embodiments, the non-volatile memory 68 may be omitted, and the encrypted biometric data reference pattern(s) may be stored in a reserved area within flash memory 56. A system for storing a secure encrypted data reference pattern in a non-volatile memory for use in a biometric memory device is disclosed in U.S. Patent Application No. 2004/0236954 entitled, "Biometric-Based Authentication In A Nonvolatile Memory Device," which application is incorporated by reference herein in its entirety. The coprocessor 60 may further include RAM 70 for temporarily storing the biometric data reference pattern(s) and scanned biometric data during a comparison for verification of a user.

Once portable memory storage device 50 is coupled to a host 52, initialization, or "pass-through," firmware on ROM 66 initializes the coprocessor 60 and the coprocessor 60 communicates with host 52 via universal asynchronous receiver-transmitter (UART) 72 and universal serial bus (USB) device interface 74 on ASIC 54. UART 72 is a known interface component that handles asynchronous serial communication between the biometric scanner system 58 and ASIC 54. Embodiments of the present invention use a USB connection to the host device. The host may include a USB host controller (not shown) and a USB port 160 (FIG. 13) for receiving a USB connector 416 of the portable memory storage device 50 as explained hereinafter. Depending on the host operating system, software drivers and/or an application programming interface (API) may need to be downloaded into the host 52 before communication with the portable memory storage device 52 is enabled.

The invention is not limited to USB communication between the portable memory storage device 50 and the host device 52, and other communication protocols, both cabled and wireless, are contemplated. Moreover, it is understood that ASIC 54 may include additional known components in alternative embodiments of the invention. Examples of such additional components are disclosed in U.S. Patent Application No. 2003/0005336 entitled, "Portable Device Having Biometrics-Based Authentication Capabilities," which application is incorporated by reference herein in its entirety. Further still, while the storage and comparison of entered and stored biometric data has been described above as being performed by coprocessor 60, it is understood that these operations may be carried out by processor 55 on ASIC 54, or within host device 52, in alternative embodiments.

In embodiments, power for the portable memory storage device 50 is received from the host 52 via the USB connection. However, the device 50 may include an independent onboard power supply in alternative embodiments.

Figure 6:
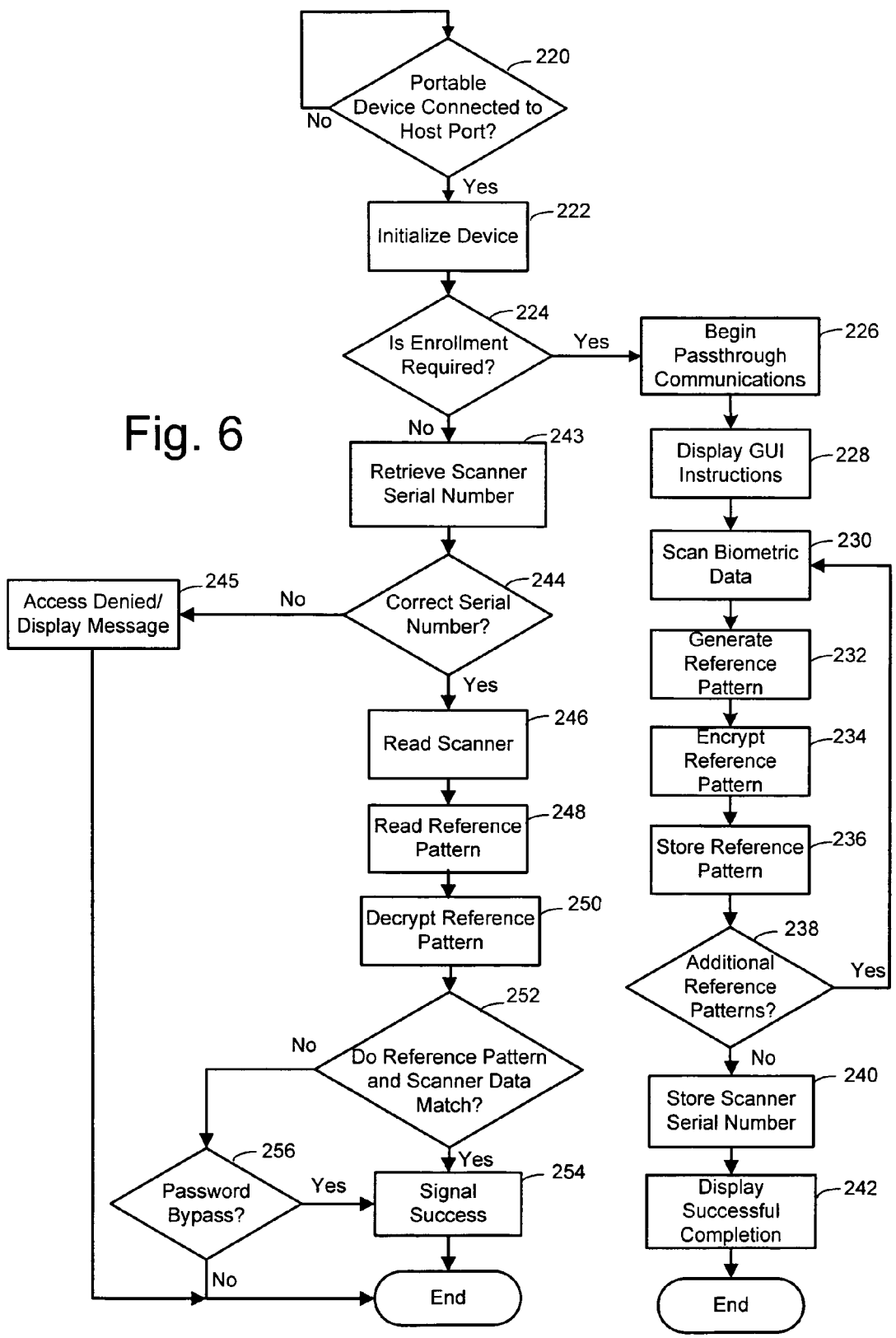
FIG. 6 is a software flowchart illustrating the operation of an embodiment of the invention for authenticating a user with biometric data.

An embodiment of the operation of the biometric scanner device to allow only authorized access to memory 56 will now be described with reference to the flowchart of FIG. 6. In step 220, the firmware in ROM 66 checks to see whether the portable memory storage device 50 has been connected to the USB port of the host device. Upon being coupled to a host platform, portable device 50 undergoes an initialization procedure (step 222). In embodiments, the initialization procedure involves establishing communication with the host platform via the USB device interface 74, and ensuring the host platform is aware that portable memory storage device 50 has been coupled thereto.

The authentication coprocessor 60 next determines whether a user registration is necessary (step 224). This may occur where device 50 is being used for the first time and no reference pattern(s) of biometric data are stored in non-volatile memory 68. In the event it is determined in step 224 that no reference patterns are stored, pass-through communications between the authentication processor and host are carried out to perform the enrollment process (step 226). The host 52 displays instructions to guide the user through the registration process (step 228), and the user is prompted to place a finger (or other applicable biometric indicia) on the scanner 58 (step 230). This obtained biometric data is to be stored as the reference pattern for use in future comparisons with scanned user biometric data when access to the memory 56 is sought. It may be necessary to repeat step 230 as requested by the display on the host 52 until a satisfactory reference pattern is obtained. Preferably, the number of retries is user-configurable. Assuming a satisfactory reference pattern is obtained (step 232), the reference pattern is then encrypted for additional security (step 234). Known cryptographic or hashing algorithms may used to encrypt the reference pattern. The encrypted reference pattern is then stored in non-volatile memory 68 in step 236. The size of the stored reference pattern may vary in alternative embodiments, but may for example be 512 bytes.

In embodiments, portable memory storage device 50 supports more than one user. In another embodiment, the same user may register multiple fingerprints as separate reference patterns. In a further embodiment, the same user fingerprint may be registered multiple times as different reference patterns. Thus, portable device 50 can facilitate the registration of additional user(s) and/or additional reference pattern(s). The software can prompt for additional user(s) and/or additional reference pattern(s) in step 238. If additional user(s) and/or additional reference pattern(s) are indicated, steps 230 through 236 are repeated. The ability to add additional user(s) and/or additional reference pattern(s) may also be provided for example on start-up when there are already stored reference patterns.

The electronics forming the biometric scanner system 58 is an integral chipset that may be added to or removed from the printed circuit board that supports the ASIC controller 54 and memory 56. In order to prevent against the removal and addition of a new biometric scanner system to gain unauthorized access the information on the memory 56, the coprocessor 60 may additionally store the serial number of the biometric scanner system 58 (and possibly controller 54) in memory 56 in step 240. As non-volatile memory 68 associated with the biometric scanner system 58 would likely be removed in the event the system 58 is replaced, the stored serial number is preferably not be stored in non-volatile memory 68. The stored serial number information will be used during the verification process explained hereinafter. Step 240 may be omitted in embodiments of the invention.

Once the registration process is completed, the graphical user interface may then indicate the successful completion in step 242.

In the event the authentication coprocessor indicates that there are one or more stored reference patterns in step 224, the software scans a user's biometric data to ensure that the user is authorized for access to the information on memory 56. The coprocessor 60 first reads the scanner serial number (step 243) and compares that against the scanner serial number stored in memory 56 to confirm that the serial number of the biometric scanner system 58 is the same as was stored during the registration process (step 244). In the event they are different, access to the drive is denied and the appropriate message is displayed in step 245. In embodiments of the invention, instead of simply denying access, the user may be given the option to enter a password in the event the stored and read serial numbers do not match. If the appropriate password is entered, access to the drive may still be granted. In embodiments where storage of the serial number is omitted, steps 243-245 may similarly be omitted.

Upon matching serial numbers, the user is prompted in step 246 to place his or her finger (or other biometric indicia) on the scanner, and the scanned image is digitized and loaded into RAM 70. If an unsatisfactory image is obtained, the user may be prompted to try again. Preferably, the number of retries is user-configurable. Assuming a satisfactory image is obtained, the stored reference patterns(s) are then read from non-volatile memory 68 and loaded into RAM 70 (step 248), decrypted (step 250), and compared in step 252 against the data obtained in step 246. If an appropriate match is found, the host display indicates a successful scan (step 254), and access to the data within memory 56 is granted.

In embodiments of the invention, when user authentication in steps 246-252 fail to produce a corresponding match, access to flash memory 56 is blocked and the appropriate message is displayed by the host device 52. Blocking of memory 56 can be done by various methods, including shutting down or disabling the ASIC controller 54 or the flash interface associated with memory 56, or configuring the controller to refuse read and write commands. It can also be accomplished by the host device. In embodiments, the user may be given the option of repeating steps 246-252 in the event of a failed verification. Preferably the number of retries is user-configurable.

In embodiments of the invention, in the event of a failed verification, the user may be provided with an option to bypass the fingerprint authentication and provide a password to gain access instead in step 256. If the bypass password is correctly entered, user authentication is deemed to be successful and step 254 is performed, and access to the data within memory 56 is granted. If the bypass password is not properly entered, user verification remains a failure and access is denied. The amount of password entry retries may be user-configurable. It should also be appreciated that if added security is desired, a password requirement can be implemented in addition to the fingerprint authentication even for normal routine authentication within the scope of the present invention.

It should be appreciated that in an embodiment where authentication is carried out in the host device, appropriate modifications to the authentication process described above are needed. Thus, depending on the particular implementation or application, the information being transmitted from portable device 50 to host device 52 can either be a simple notification of success upon successful authentication, or image data representing a user fingerprint that is pending authentication.

Where there are stored reference patterns, it is contemplated that different reference patterns will have different access privileges to the memory 56. Thus, access to files and directories on memory 56 may be blocked for certain users while being available to others. Access may be controlled to grant different degrees of access by either the coprocessor 60, ASIC 54 or in the host device 52. Access privileges may be set up for example by an administrator.

Figure 7:
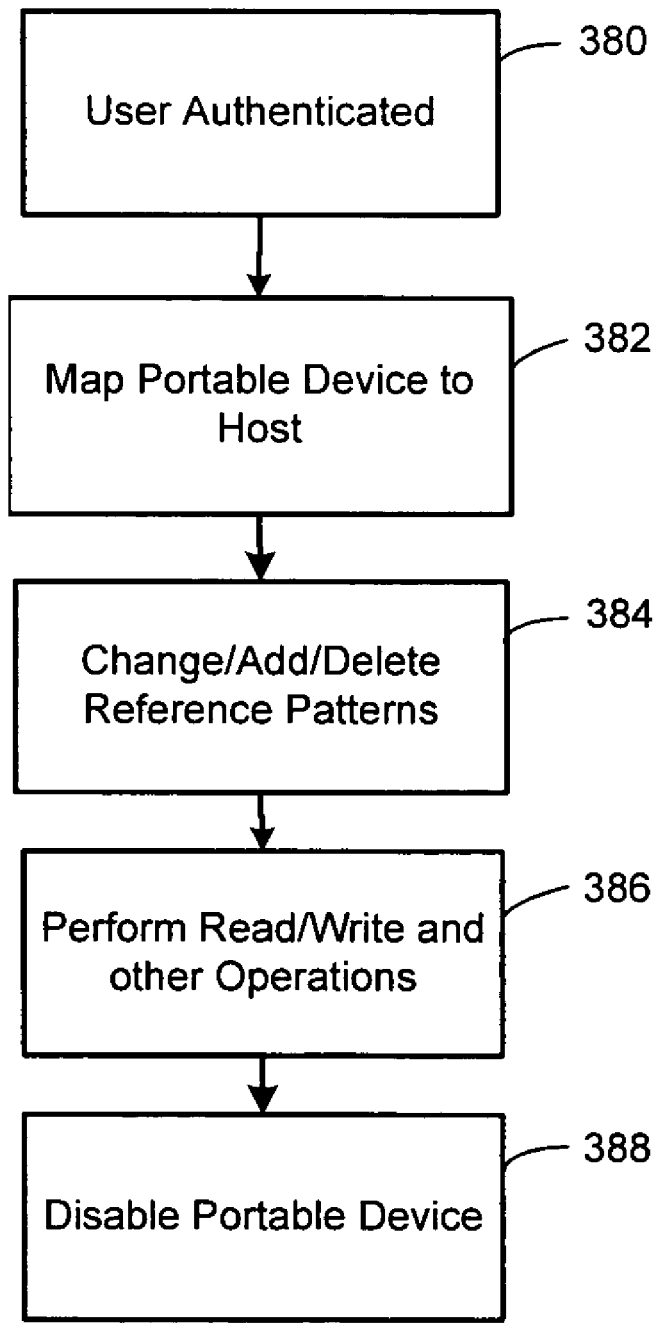
FIG. 7 is a flowchart illustrating communication between the portable memory storage device and a host device after user authentication.

FIG. 7 is a flowchart illustrating communications between the portable memory storage device 50 and host device 52 once the biometric scanner system authenticates a user. After a user is authenticated in step 380, the portable memory storage device may be mapped to the host device in step 382. The user may also be given the option via the graphical user interface on the host to change, add or delete stored biometric reference patterns in step 384. The user may also be given the ability to read from device 50, write to device 50, execute applications from device 50 and perform operations specified by the device 50 in a step 386. Upon completion of all desired operations, the user can disable the portable memory storage device via the graphical user interface of the host device in a step 388.

Figure 8:
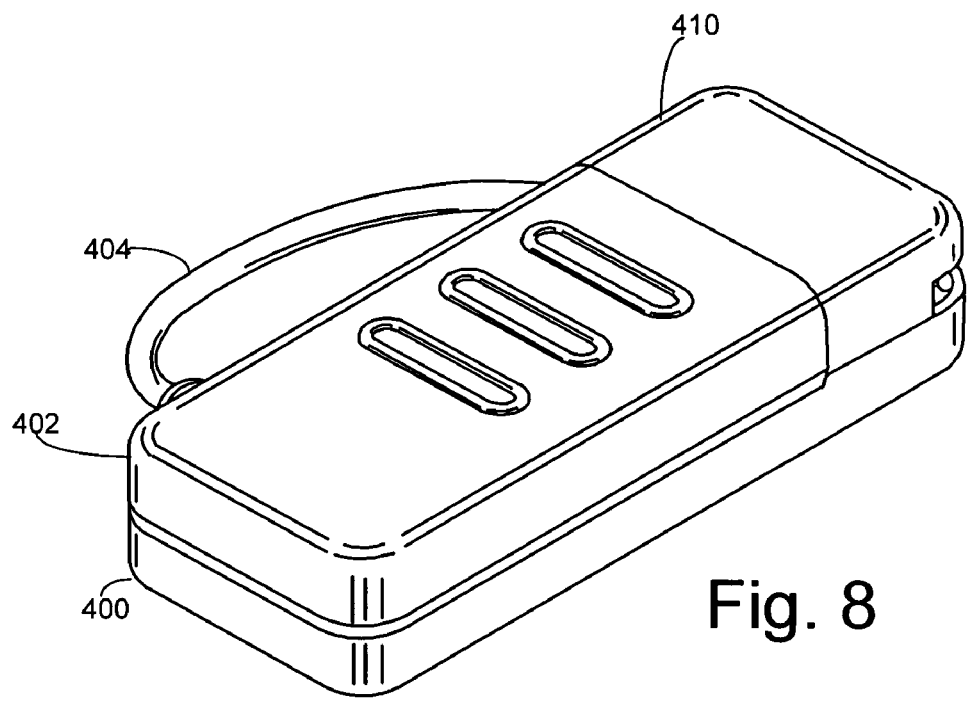
FIGS. 8 and 9 are different perspective views of the portable memory storage device according to embodiments of the present invention.
Figure 9:
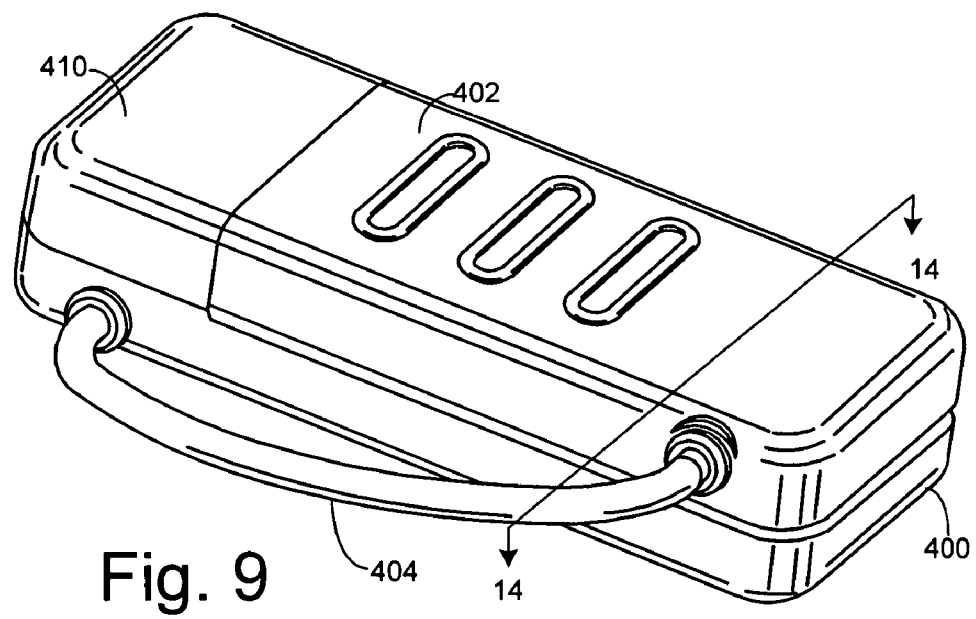

Perspective views of the portable memory storage device 50 are shown in FIGS. 8-11. FIGS. 8 and 9 illustrate the storage device in a closed position, and FIGS. 10 and 11 illustrate the storage device in the open position, as explained in greater detail below. As seen in FIG. 10, device 50 includes a base 400, a cover 402, and a flexible communications cable 404 extending between and coupling the base 400 to cover 402. Base 400 includes a well or recessed section 406 on an upper surface 408, in which recessed section is positioned the biometric scanner 62. The recessed section 406 is large enough to accept a finger or thumb so as not to interfere with the location of a finger or thumb on scanner 62 during scanning.

Base 400 further includes a docking enclosure 410 mounted on or formed integrally with the upper surface 408. The docking enclosure 410 defines an opening 412 sized and shaped to accept a connector 414 extending out of cover 402. As indicated above, portable memory storage device 50 is used with a USB serial port in embodiments of the invention, and for such embodiments, connector 414 is sized and shaped to fit within a USB serial port on a host device. The opening 412 is sized accordingly to provide a snug fit of the connector 414 within the opening 412. It is understood that for other serial connections, both connector 414 and opening 412 defined by docking enclosure 410 will be configured differently than shown to match the host port into which the connector fits.

In embodiments of the invention, the cable 404 may have a length of between 70 mm and 110 mm, and more particularly between 80 mm and 100 mm, and more particularly, about 90 mm. It is understood that the length of cable 404 may be less than 70 mm and greater than 110 mm in alternative embodiments. In embodiments, the cable 404 is fixedly attached to the base 400 and the cover 402. It is understood that the cable may be removably connected to the base and/or the cover in alternative embodiments.

In a further embodiment of the invention shown in FIG. 11, cable 404 may be omitted so that communication between the base 400 and cover 402 occurs wirelessly. Wireless protocols such as Bluetooth® may be used for such embodiments. The Bluetooth system is described in detail in the "Specification of the Bluetooth System," Version 1.1, Feb. 22, 2001, available at www.Bluetooth.com and/or www.Bluetooth.org, a copy of which specification is incorporated by reference herein in its entirety. It is understood that other Wireless Local Area Network (WLAN) protocols may be used to establish wireless communication between the base 400 and cover 402 in alternative embodiments. In embodiments that use wireless communication, base 400 and cover 402 each include a wireless transmitter/receiver. For example, instead of (or in addition to) UART 72, ASIC 54 would connect to a wireless transmitter/receiver and (optionally) support logic. Similarly, system 58 would include a wireless transmitter/receiver and (optionally) support logic in communication with authentication coprocessor 60.

Figure 12:
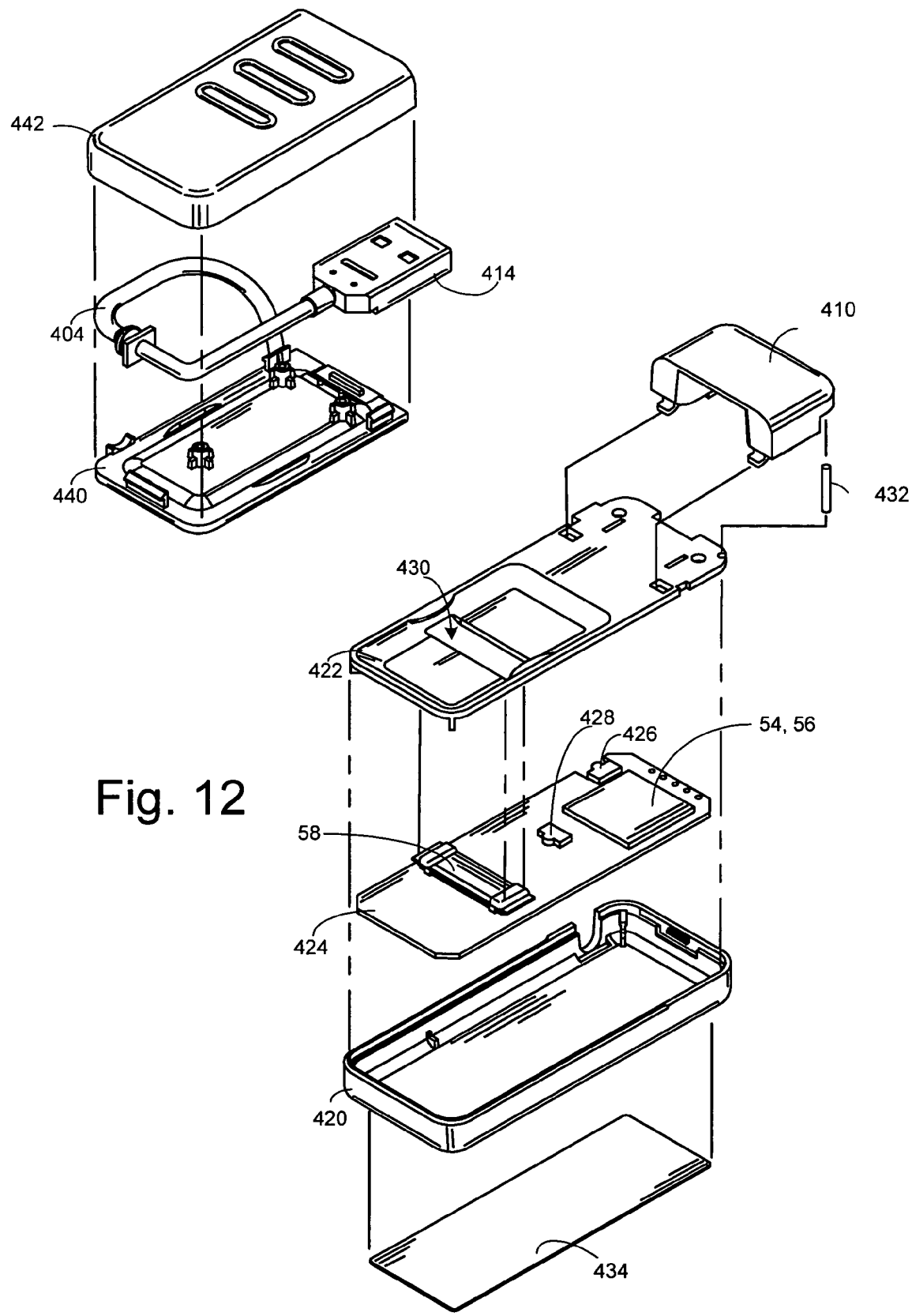
FIG. 12 is an exploded perspective view of the portable memory storage device according to embodiments of the present invention.

FIG. 12 is an exploded perspective view of base 400 and cover 402. Base 400 includes a bottom portion 420 and a top portion 422 which substantially enclose a printed circuit board (PCB) 424 having the above described electronics thereon: namely the ASIC 54, flash memory 56 and biometric scanner system 58. The PCB 424 may further house LEDs 426 and 428. These LEDs may be used instead of or in addition to the graphical user interface described above to give the status (e.g., access granted or access denied) of the portable memory device. A window 430 may be provided through top portion 422 through which the scanner 62 may be accessible. The top and bottom portions 420, 422 may be formed of polycarbonate or other plastic, or metal, and may snap fit together or be affixed by welding or adhesive. Once the top and bottom portions are sealed together, PCB 424 is isolated from the surrounding environment, with the exception of a portion of the scanner 62.

Docking enclosure 410 may be formed of polycarbonate or other plastic, or metal, and may be mounted to the top portion 422 of base 400 by a snap fit connection, or by welding or adhesive. A pin 432 is mounted in a space at a corner of the base 400, extending between the docking enclosure 410 and bottom portion 420. The space and pin allow the portable memory device 50 to be conveniently mounted on a cord for easy transport. The corner space and pin 432 may be omitted in alternative embodiments. A rubber pad 434 may be affixed to the underside of the bottom portion 420 to improve the frictional engagement of the base 400 and a surface on which the base is supported. The rubber pad 434 may be omitted in alternative embodiments.

Cover 402 includes a bottom portion 440 and a top portion 442 which enclose a portion of the cable 404 and, in embodiments, a portion of connector 414. At least a portion of connector 414 extends outside of the enclosure formed by bottom and top portions 440, 442 for receipt within the port of the host device. Cable 404 may have a rigid or flexible portion within the enclosure formed between the bottom and top portions 440, 442, but the portion of the cable 404 extending outside of the enclosure is preferably flexible. In the exploded view shown in FIG. 12, the cable is separated from the base 400, but would be coupled thereto in the assembled device, with one or more leads within the cable being coupled to the PCB 424 within the base 400. The top and bottom portions 440, 442 of the cover 402 may be formed of polycarbonate or other plastic, or metal, and may snap fit together or be affixed by welding or adhesive.

The portable memory device may be manufactured by assembling the printed circuit board 424, with ASIC 54, memory 56, LEDs 426 and 428 and biometric scanner system 58, within the bottom portion 420. A first end of cable 404 may then be affixed to the printed circuit board 424, and the top portion 422 of the base 400 may then be affixed to the bottom portion 420. The docking enclosure 410, pin 432 and rubber pad 434 may then be affixed to the base 400. It is understood that the order of these assembly steps may vary in alternative embodiments. Cable 404, with the connector 414 affixed to a second end opposite the first end, may then have a portion enclosed between bottom portion 440 and the top portion 442 with at least a portion of the connector 414 protruding from the cover, and then the bottom and top portions of the cover affixed together.

Figure 13:
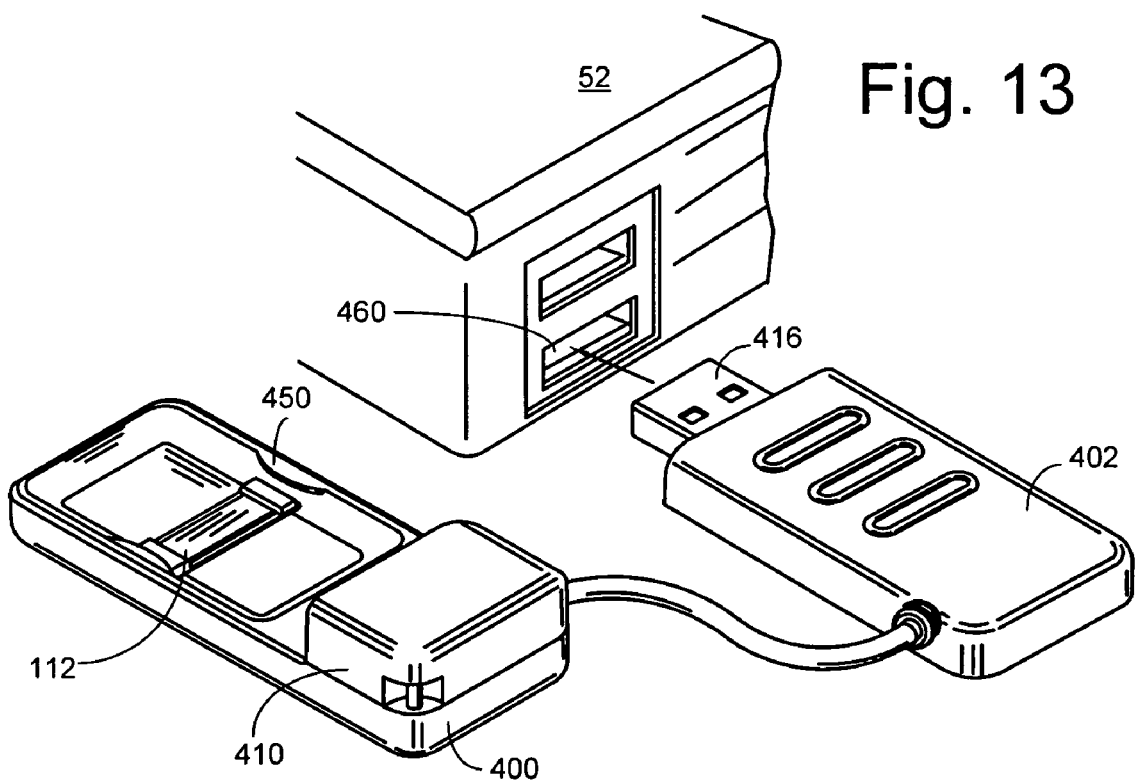
FIG. 13 is a perspective view of the present invention in position for connection to a USB port of a host device.
Figure 14:
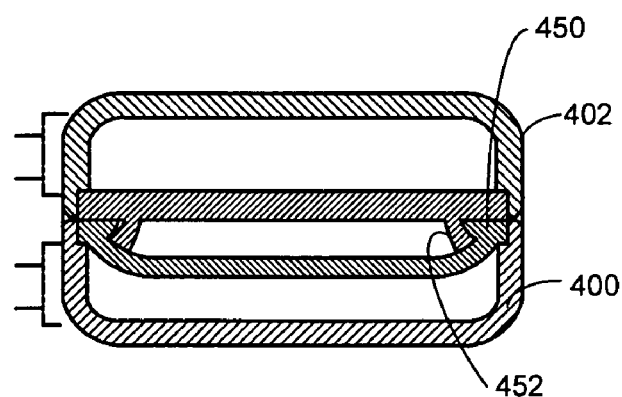
FIG. 14 is a cross-sectional view through line 14-14 in FIG. 9 showing the interlocking mechanisms for maintaining the cover on the base when in the closed position.

As indicated above, the portable memory device 50 according to embodiments of the present invention moves between a closed position (shown in FIGS. 8 and 9) and an open position (shown in FIGS. 10, 11 and 13). In the open position, the connector 414 of cover 402 is capable of engaging with a USB port 460 of a host device 52 to allow communication between the portable memory device 50 and the host device 52 (provided the biometric authentication has been successfully completed). While the cover 402 is engaged with the USB port of the host device, the cable 404 allows the base 400 to be positioned in a location that is selectable and convenient to the user for easy access when performing the biometric scan. That is, while the cover 402 is engaged with a USB port, the orientation and position of the scanner 62 and base 400 can be changed to make it easier for the user to perform the biometric scan.

When communication with a host device has been completed, the cover 402 may be removed from the serial port, and slid into secure engagement with the base 400. The docking enclosure 410 may have an internal configuration similar in shape to the serial port of the host device so that the connector 414 engages the internal wall of the docking enclosure in a press-fit engagement to hold the cover on the base.

Additionally or alternatively, the base and cover may have mechanisms forming interlocking engagement to secure the base and cover together in the closed position. An example of such mechanisms are explained with respect to FIG. 14, which is a cross-section through line 14-14 in FIG. 9. In embodiments, the base may include rounded projections 450 (as seen for example in FIGS. 13 and 14), which protrude inward slightly from the sides of the top portion 422 of base 400, on either side of the biometric scanner 62. The cover may include a pair of dovetails 452 (as seen for example in FIG. 14). When the cover is slid onto the base, the dovetails 452 have a portion which slides beneath the projections 450 to make an interlocking joint between the base and cover. Thus, the cover will not dislodge from the base unless it is intentionally slid off of the base.

In the closed position, the cover partially or fully covers the scanner 62, thus protecting the scanner and preventing the scanner from being damaged while not in use. When closed, the cover may lie substantially in contact with the base, or may be slightly spaced therefrom with contact being established only at certain points around the periphery of the cover. In embodiments where portions of the cover periphery are spaced from the base, the space is preferably small enough to prevent exposure of the scanner 62.

In the closed position, the connector 414 resides within the docking enclosure 410 to also prevent the connector from being damaged while not in use. Moreover, in a closed position, the portable memory device 50 attains a relatively compact form factor and convenient shape. In embodiments of the invention, the portable memory device may be 60 mm long, 24 mm wide and 14 mm high. It is understood that these dimensions are by way of example only, and the various dimensions may be larger or smaller than that in alternative embodiments.

As indicated above, in embodiments of the invention, the ASIC 54, memory 56 and biometric scanner system 58 are all housed within the base 400. In an alternative embodiment, the ASIC and/or the memory may be housed within the interior of the cover 402, and be connected with the biometric scanner system via the cable 404.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A portable memory storage device operable with a host device, comprising:
   a flexible cable having a first end and a second end;
   a first section including a biometric device for receiving biometric data, the first section coupled to the first end of the flexible cable; and
   a second section including a connector for establishing communication between the portable memory storage device and the host device, the second section coupled to the second end of the flexible cable, the flexible cable electrically coupling the first and second sections, the first section is separable and freely movable in three dimensional space with respect to the second section to an extent allowed by the flexible cable, and the second section capable of mating with, and at least partially covering, the first section.

2. A portable memory storage device as recited in claim 1, further comprising a semiconductor memory storage device in one of the first and second sections.

3. A portable memory storage device as recited in claim 1, further comprising a flash memory in one of the first and second sections.

4. A portable memory storage device as recited in claim 3, wherein access to information stored on the flash memory is allowed if biometric data received matches a stored reference pattern of biometric data.

5. A portable memory storage device as recited in claim 3, wherein access to information stored on the flash memory is prevented if biometric data received does not match a stored reference pattern of biometric data.

6. A portable memory storage device as recited in claim 3, further comprising a microcontroller in one of the first and second sections.

7. A portable memory storage device as recited in claim 3, the biometric device capable of communicating with the flash memory.

8. A portable memory storage device as recited in claim 1, wherein the flexible cable transfers communications between the first and second sections.

9. A portable memory storage device as recited in claim 1, wherein the biometric data includes one of a fingerprint, a thumbprint, voice data signal and retinal data image.

10. A portable memory storage device as recited in claim 1, the biometric scanner including a portion adjacent an upper surface of the first section, the second section covering the biometric scanner when mating with the first section.

11. A portable memory storage device as recited in claim 10, the first section including a docking enclosure, the connector fitting within an opening in the docking enclosure when the second section is mated with the first section.

12. A portable memory storage device as recited in claim 1, wherein the connector is capable of fitting within a USB port on the host device.

13. A portable memory storage device as recited in claim 1, wherein the first and second sections include structure for securing the first and second sections together when mated together.

14. A portable memory storage device as recited in claim 1, wherein the second section lies in full engagement with the first section when mated together.

15. A portable memory storage device as recited in claim 1, wherein the second section has portions spaced from the first portion when mated together.

16. A portable memory storage device as recited in claim 1, wherein the host device is one of a personal computer, a digital camera, a personal digital assistant and a cellular telephone.

* * * * *